(12) United States Patent
Belloso

(10) Patent No.: US 7,410,021 B1
(45) Date of Patent: Aug. 12, 2008

(54) FUEL-EFFICIENT VEHICLE WITH AUXILIARY CRUISER ENGINE

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 584 days.

(21) Appl. No.: 11/229,122

(22) Filed: Sep. 19, 2005

(51) Int. Cl.
*B60K 5/08* (2006.01)

(52) U.S. Cl. .................. 180/69.6; 180/54.1; 477/2; 477/6

(58) Field of Classification Search ............ 180/69.6, 180/54.1, 14.2; 477/2, 6; 475/1
See application file for complete search history.

(56) References Cited

U.S. PATENT DOCUMENTS

| | | | | |
|---|---|---|---|---|
| 4,392,393 A | * | 7/1983 | Montgomery | ............... 74/661 |
| 4,439,989 A | | 4/1984 | Yamakawa | |
| 4,560,021 A | * | 12/1985 | Yamakawa | ............... 180/54.1 |
| 4,588,040 A | * | 5/1986 | Albright et al. | ............ 180/165 |
| 5,398,508 A | * | 3/1995 | Brown | ........................ 60/718 |
| 6,179,078 B1 | * | 1/2001 | Belloso | ..................... 180/69.6 |
| 6,306,056 B1 | * | 10/2001 | Moore | ........................... 475/5 |
| 6,637,283 B2 | * | 10/2003 | Belloso | ...................... 74/342 |
| 6,722,458 B2 | * | 4/2004 | Hofbauer | .................. 180/65.4 |
| 7,152,705 B2 | * | 12/2006 | Alster et al. | .............. 180/65.2 |

* cited by examiner

*Primary Examiner*—Christopher Ellis
*Assistant Examiner*—Katy Meyer
(74) *Attorney, Agent, or Firm*—Norman B. Rainer (57) ABSTRACT

An automotive vehicle having improved fuel economy is equipped with a drive system having a primary internal combustion engine and an auxiliary internal combustion engine of smaller size and better fuel economy than the primary engine. The primary engine is adapted to take the vehicle to its cruising speed, at which point the auxiliary engine is activated and interacts by way of an automatic clutch system to power the vehicle while the primary engine is disconnected from the drive system and throttled down.

17 Claims, 9 Drawing Sheets

FUEL-EFFICIENT VEHICLE WITH AUXILIARY CRUISER ENGINE

BACKGROUND OF THE INVENTION

1. Field of the Invention

This invention concerns fuel-efficient vehicles, and more particularly relates to automobiles having multiple power sources which are continuously interactive in a manner to serve the operational needs of the automobile in acceleration, cruising and hill-climbing.

2. Description of the Prior Art

Considerable attention has been directed in recent years toward the development of "hybrid" vehicles having improved fuel efficiency. Such hybrid vehicles generally have an internal combustion engine, and an electric motor adapted to augment the output of the internal combustion when additional power is needed. Re-chargeable storage batteries on the vehicle energize the electric motor.

The hybrid vehicles generally require severe down-sizing of the internal combustion engine to achieve the sought fuel efficiency for cruising operation, namely travel of the vehicle at substantially constant speed on a reasonably non-hilly road. The batteries must be of high amperage capacity with associated control components in order to adequately power the motor. Such requirements result in high initial cost and high maintenance costs as well as problems related to availability of repair and other services. These added costs are often not fully offset by the savings attributable to fuel efficiency. For instance, the additional cost of the batteries alone is often not yet fully offset by the savings in fuel costs before these expensive batteries reach the end of their useful life and would need to be replaced. Non-hybrid fuel-efficient vehicles also have problematic balances between operating costs and purchase price.

U.S. Pat. No. 6,179,078 to Belloso discloses a fuel-efficient and inexpensive automobile having two engines, each coupled to a drive wheel by way of a continuously variable ratio torque converter. Both engines are used for acceleration or hill-climbing, then either engine is used for economical cruising. One disadvantage of this system is the limited power capacity and speed range of current continuously variable ratio torque converters, especially when used for acceleration and hill-climbing.

U.S. Pat. No. 6,637,283 to Belloso discloses a Control Apparatus for a Continuously Variable Transmission (CVT) which increases its operational speed range, adds reverse functionality and provides means for it to accommodate two separate power sources. It does not improve its power handling capacity.

U.S. Pat. No. 4,439,989 to Yamakawa discloses a system wherein two or more engine units are each coupled to a transmission through an electromagnetic power clutch. The system includes means for operating the engines at a proper phase difference of, preferably, 180 degrees to prevent unwanted vibrations. This system is complex and is not readily adaptable for use in automotive vehicles, particularly for the particular purpose of improving fuel efficiency.

Other disclosures of wheeled vehicles employing multiple engines or motors are found in U.S. Pat. Nos. 4,481,841; 4,306,630; 4,475,611; 5,253,724; and 5,429,543.

U.S. Pat. No. 2,462,902 to Rockwell, et. al., discloses a vehicle with a main engine that drives the rear axle and a booster engine that drives the front axle. The main engine is associated with a power train having a clutch, speed change transmission, propeller shaft, two-speed rear axle drive gear, and differential. The booster engine has a power train consisting of a clutch, speed change transmission, propeller shaft, disengageable rear drive, and differential. Although the dual engines of Rockwell, et. al., provide some versatility of operation, particularly when the main engine is overloaded and requires the added power of the booster engine, the several required power train components increase the cost and weight of the vehicle, and do not necessarily improve fuel efficiency.

None of the aforesaid disclosures provide a simpler and more cost-effective way to improve the fuel efficiency of automotive vehicles, particularly for long distance travel on the highways.

It is accordingly a primary object of this invention to provide a simple mechanical alternative to the complex and expensive hybrid system as means for improving the fuel efficiency of automotive vehicles.

It is another object of the present invention to provide a fuel-efficient vehicle through maximal use of the existing power train of current motor vehicles and making only those changes that are minimally necessary to permit the vehicle to travel economically at cruising speeds over long distances.

Yet another object of this invention is to provide a fuel-efficient vehicle of the aforesaid nature employing a minimum of modifications of the power train and integral structure of current motor vehicles, so that the invention can be employed not only in the manufacture of new vehicles, but can also be offered as after-market "add-on" modification of existing motor vehicles.

These objects and other objects and advantages of the invention will be apparent from the following description.

SUMMARY OF THE INVENTION

The fundamental feature of this invention is the reversal of the roles played by the primary engine and the auxiliary engine. Whereas in the prior art the primary engine is generally used for long distance travel and has, therefore, to be downsized for fuel-efficiency, and whereas the auxiliary engine is generally used to provide additional power for acceleration and hill-climbing, etc., in this invention their roles are reversed. Thus, in this invention the primary engine is mostly used only for acceleration and hill-climbing, etc., and the auxiliary engine is used mainly to maintain the vehicle at optimum cruising speeds in order to travel economically over long distances on the highway. As a result, the primary engine and power train can remain essentially intact, and the auxiliary engine can be of any desired size and power to provide the vehicle with the most satisfactory balance of fuel economy and performance, particularly for long distance cruising. In the most simple embodiment, the auxiliary engine need not even be equipped with a speed change transmission.

The above and other beneficial objects and advantages are accomplished in accordance with the present invention by an improved automotive vehicle having a chassis, a car body mounted on said chassis, vehicle control means within said car body, power train means consisting of a primary engine, speed change transmission, propeller shaft and differential, front and rear wheels, suspension means and steering means, the improvement comprising:

a) an auxiliary internal combustion engine of smaller size and better fuel efficiency than said primary engine, yet having sufficient power to maintain the vehicle at an acceptable cruising speed, b) a power output shaft associated with said auxiliary engine, clutch means interactive with said power output shaft, and a power take-off shaft associated with said clutch means, and c) power transfer means for transferring power laterally between said power take-off shaft and said differential, whereby d) power from said auxiliary engine may be selectively conveyed to said take-off shaft, thence to said power transfer means and to said differential, e) said conveyance of power occurring after said vehicle has been accelerated to cruising speed by said primary engine, and said speed change transmission means is shifted to "neutral" to disengage said primary engine from said differential, thereby placing the vehicle in a free wheeling state, after which f) said auxiliary engine is accelerated to operational speeds, thereby automatically causing engagement of said clutch means and transfer of power to said differential, thus achieving two desirable results, namely:

g) enabling said auxiliary engine to maintain the vehicle at cruising speed with reduced fuel consumption per unit of distance traveled, and h) enabling the power train means including said primary engine to remain ready to be activated whenever increased power is needed.

Said clutch means is a releasable coupling means such as a frictional clutch, centrifugal clutch or continuously variable torque converter. Said power transfer means may be an endless chain connected to sprockets, or spur gears, or combinations thereof. An over-riding sprag clutch may optionally be disposed between said take-off shaft and said power transfer means.

BRIEF DESCRIPTION OF THE DRAWING

With these and other advantages in view, the invention is disclosed in the following description which will be more fully understood when it is read in conjunction with the following drawings in which.

For clarity of illustration, details which are not relevant to the invention, such as engine mounts, transmission mounts, undercarriage of the vehicle, and most details of the internal parts of the speed change transmission, differential and transaxle, etc., have been omitted from the aforesaid drawings.

DESCRIPTION OF THE PREFERRED EMBODIMENTS

Figure 1:
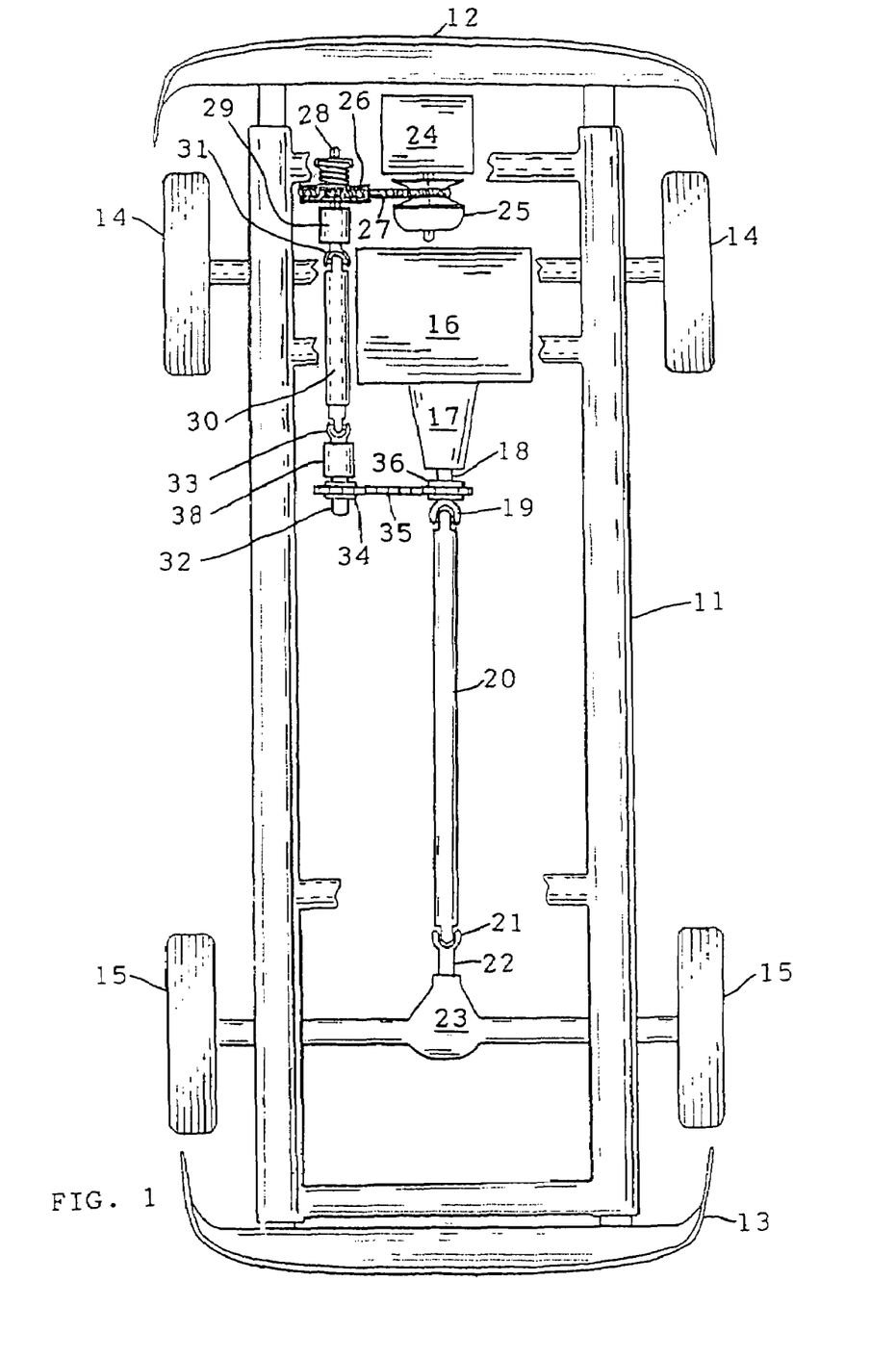
FIG. 1 is a schematic top view of an embodiment of the fuel-efficient vehicle of the present invention.

Referring now to the above drawings wherein one character designates one part of the vehicle, FIG. 1 shows the vehicular chassis 11 connected to the front bumper 12 and rear bumper 13, and supported by front wheels 14 and rear wheels 15.

Primary engine 16 is mounted on chassis 11 and coupled to speed change transmission 17 whose output shaft 18 is connected through front universal joint 19 to propeller shaft 20 which is connected through rear universal joint 21 to pinion drive 22 to differential 23. Transmission 17 is either manual or automatic, and is of the type that can be shifted to "neutral" while the vehicle is in motion. Differential 23 drives the rear wheels 15. Thus far this vehicle may be described as a standard front engine, rear wheel drive vehicle capable of satisfactory performance, particularly for acceleration and hill climbing.

Auxiliary engine 24 is mounted on chassis 11 within the engine compartment of the vehicle. The power output of auxiliary engine 24 is matched to the size and weight of the vehicle so that said engine 24 is capable of maintaining the vehicle at optimum cruising speeds on the highways while it is operated at maximum thermal efficiency, i.e., at speeds where it achieves maximal fuel economy per distance traveled.

Clutch means, in the form of continuously variable torque converter drive pulley 25, is mounted on the output shaft of auxiliary engine 24 and is connected to CVT driven pulley 26 by drive belt 27. Driven pulley 26 is mounted on front jack shaft 28 which is rotatively mounted on front jack shaft bearing 29 and is connected to a take-off shaft in the form of auxiliary propeller shaft 30 by front auxiliary universal joint 31. Auxiliary propeller shaft 30 is connected to rear jack shaft 32 by rear auxiliary universal joint 33. Rear jack shaft 32 is rotatably mounted on rear jack shaft bearing 38. Rear jack shaft sprocket 34 is fixedly mounted on rear jack shaft 32 and is connected by power transfer means in the form of endless chain 35 to transmission output shaft sprocket 36 which is fixedly mounted on transmission output shaft 18.

In operation, the vehicle is accelerated from a standing start to cruising speed by power from primary engine 16 transmitted through speed change transmission 17, propeller shaft 20 and differential 23 to driving rear wheels 15. To cruise economically, transmission 17 is shifted to neutral and the primary engine is reduced to idling speed. Auxiliary engine 24 is accelerated to cruising speed, which automatically engages CVT belt 27 on CVT drive pulley 25, thereby transmitting power to CVT driven pulley 26, thence through auxiliary propeller shaft 30 and through sprockets 34 and 36 and endless chain 35 to universal joint 19, propeller shaft 20, universal joint 21, pinion shaft 22 and differential 23 to drive wheels 15, thereby economically keeping the vehicle at cruising speeds. Whenever more power is needed, transmission 17 is simply shifted to "drive" and engine 16 is accelerated until the increased power is no longer needed, whereupon transmission 17 is again shifted to neutral and the vehicle is again kept at cruising speed using the smaller, more fuel-efficient auxiliary engine 24.

Figure 2:
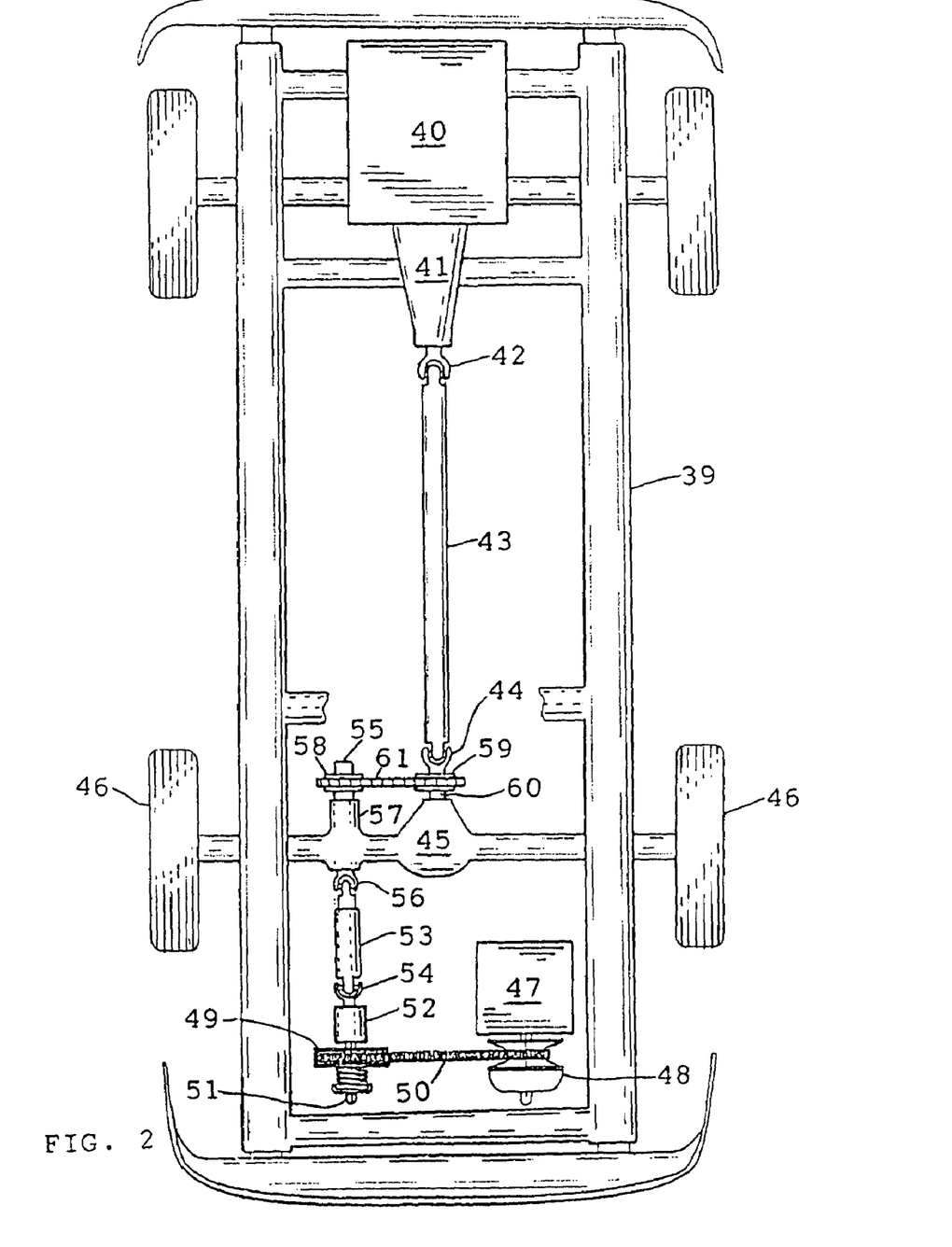
FIG. 2 is a schematic top view of a first alternative embodiment of the fuel-efficient vehicle of the present invention.

FIG. 2 illustrates an alternative embodiment of the invention showing a vehicular chassis 39 upon which is mounted the standard layout of a front-engine rear-drive vehicle, with primary engine 40, transmission 41, front universal joint 42, propeller shaft 43, rear universal joint 44, differential 45, and rear wheels 46. Auxiliary engine 47 is mounted at the rear of the vehicle. This facilitates retrofitting it on an existing vehicle. CVT drive pulley 48 is mounted on the output shaft of engine 47, and is connected to CVT driven pulley 49 by drive belt so. Driven pulley 49 is mounted on rear jack shaft 51 which is rotatably journaled to rear jack shaft bearing 52 and connected to auxiliary propeller shaft 53 by rear auxiliary universal joint 54. Auxiliary propeller shaft 53 is a two-part splined shaft to permit a degree of variation of its length to adjust for the movement of the differential 45 while the vehicle is in operation.

Auxiliary propeller shaft 53 is connected to front auxiliary jack shaft 55 by front auxiliary universal joint 56. Front jack shaft 55 is rotatably journaled to front jack shaft bearing 57 which is fixedly mounted on differential 45. Front jack shaft sprocket 58 is fixedly mounted on front jack shaft 55 and is connected to pinion drive sprocket 59 through drive chain 61. Pinion drive sprocket 59 is fixedly mounted on pinion drive shaft 60 of differential 45.

The vehicle is accelerated from a standing start by power from primary engine 40 which is transmitted through transmission 41, propeller shaft 43, pinion drive 60, and differential 45 to the wheels 46. Upon reaching the desired cruising speed, the transmission 41 is shifted to "neutral" and then engine 47 is speeded up to automatically engage torque converter belt 50 to CVT drive pulley 48 and transmit power to CVT driven pulley 49, thence through rear jack shaft 51 to auxiliary propeller shaft 53 and front jack shaft 55. Power is then transmitted further from front jack shaft 55 through sprockets 58 and 59 and chain 61 to pinion drive 60, differential 45 and wheels 46. The vehicle is now able to cruise economically on power from auxiliary engine 47.

Figure 3:
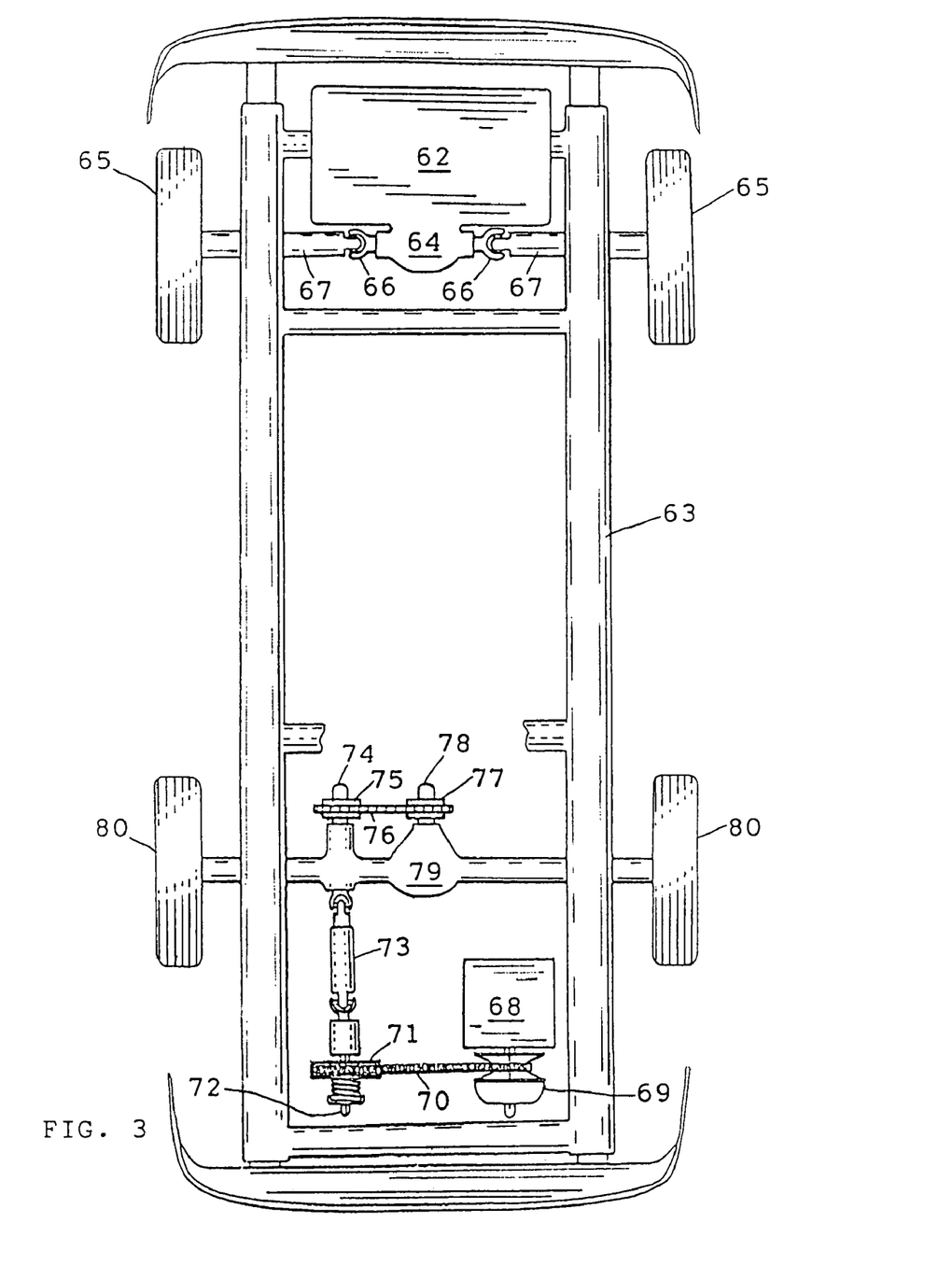
FIG. 3 is a schematic top view of a second alternative embodiment of the fuel-efficient vehicle of the present invention.

FIG. 3 illustrates a second alternative embodiment of the invention when used on a front wheel drive vehicle. Primary engine 62 is mounted on chassis 63 and is connected through transaxle 64 to front drive wheels 65 via universal joints 66 and drive shafts 67 in the conventional manner. A transaxle is a combination of two distinct parts coupled together and housed in an integrated casing, the transaxle casing. These parts are: 1) a speed change transmission, and 2) a differential.

Auxiliary engine 68 is mounted at the rear of the vehicle and is connected via CVT drive pulley 69, CVT drive belt 70, CVT driven pulley 71, rear jack shaft 72, propeller shaft 73, front jack shaft 74, drive sprocket 75, drive chain 76, driven sprocket 77 and pinion drive shaft 78 to rear differential 79, which drives the drive wheels 80.

Power for acceleration and hill climbing, etc., is taken from primary engine 62 and coursed through transaxle 64 to front drive wheels in the usual manner. To cruise economically, transaxle 64 is shifted to "neutral" and engine 68 is speeded up to automatically engage CVT drive pulley 69 to drive belt 70 and CVT driven pulley 71. Power is then transmitted from CVT driven pulley 71 to rear jack shaft 72, thence to propeller shaft 73, front jack shaft 74, drive sprocket 75, drive chain 76, driven sprocket 77, pinion drive 78, differential 79 and rear drive wheels 80.

Figure 4:
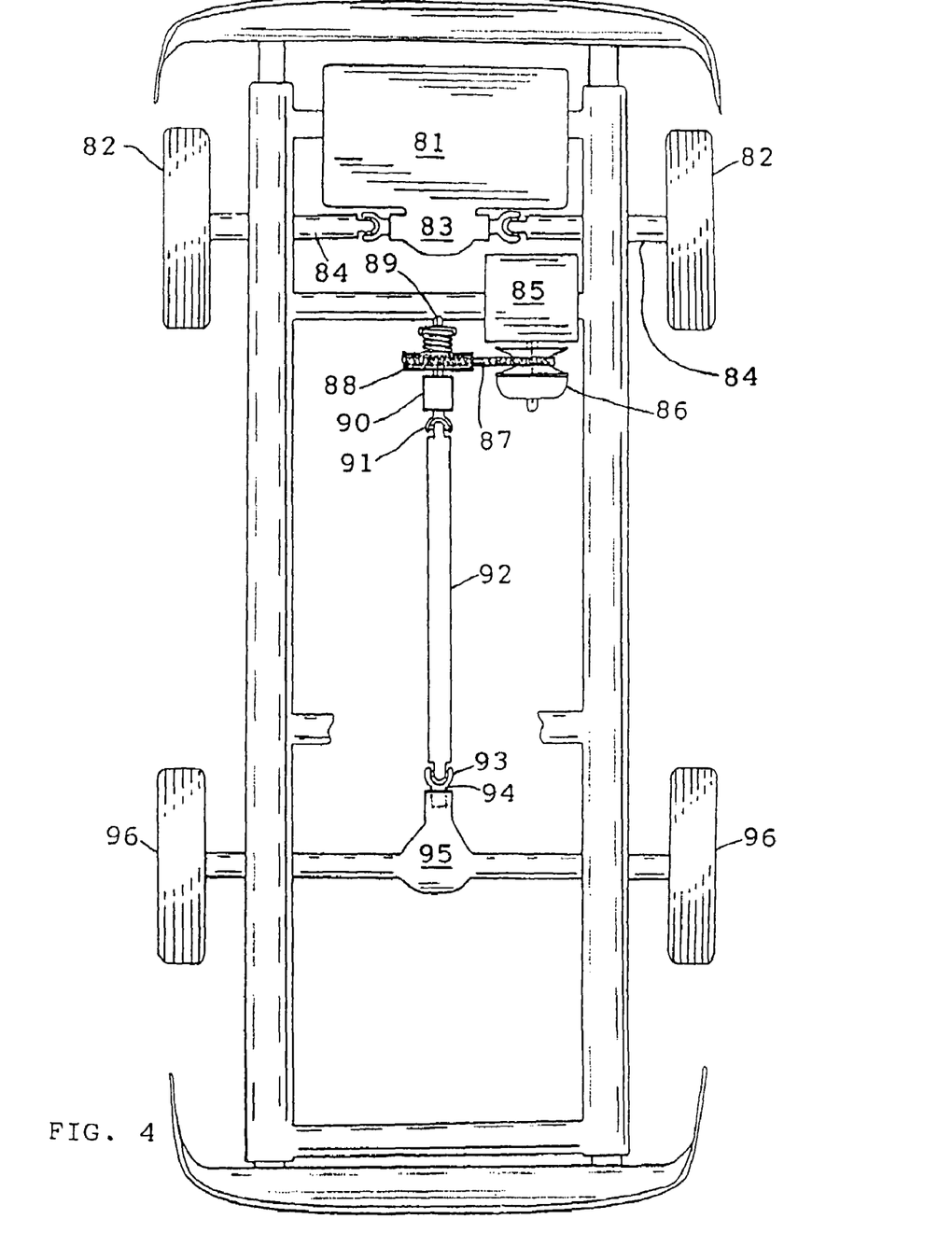
FIG. 4 is a schematic top view of a third alternative embodiment of the fuel-efficient vehicle of the present invention.

FIG. 4 illustrates a third alternative embodiment of the invention, showing a different manner of using this invention in a front-engine front-wheel-drive vehicle. Primary engine 81 is connected to front drive wheels 82 via transaxle 83 and drive shafts 84 in the conventional manner. Auxiliary engine 85 is mounted in the front of the vehicle as well, preferably in the same engine compartment as primary engine 81. This leaves space at the rear of the vehicle for the trunk, etc.

The vehicle is accelerated to cruising speed by power from primary engine 81 transmitted through transaxle 83 and drive shafts 84 to front drive wheels 82. To cruise economically, transaxle 83 is shifted to "neutral" and primary engine 81 is slowed down to idle speed or stopped altogether. Auxiliary engine 85 is then speeded up to engage CVT drive pulley 86 on CVT drive belt 87 and transmit power to CVT driven pulley 88. CVT driven pulley 88 is fixedly mounted on jack shaft 89 which is journaled on jack shaft bearing 90 and connected via front universal joint 91 to propeller shaft 92, thence through rear universal joint 93 to pinion drive 94 and differential 95 which drives the rear drive wheels 96.

Figure 5:
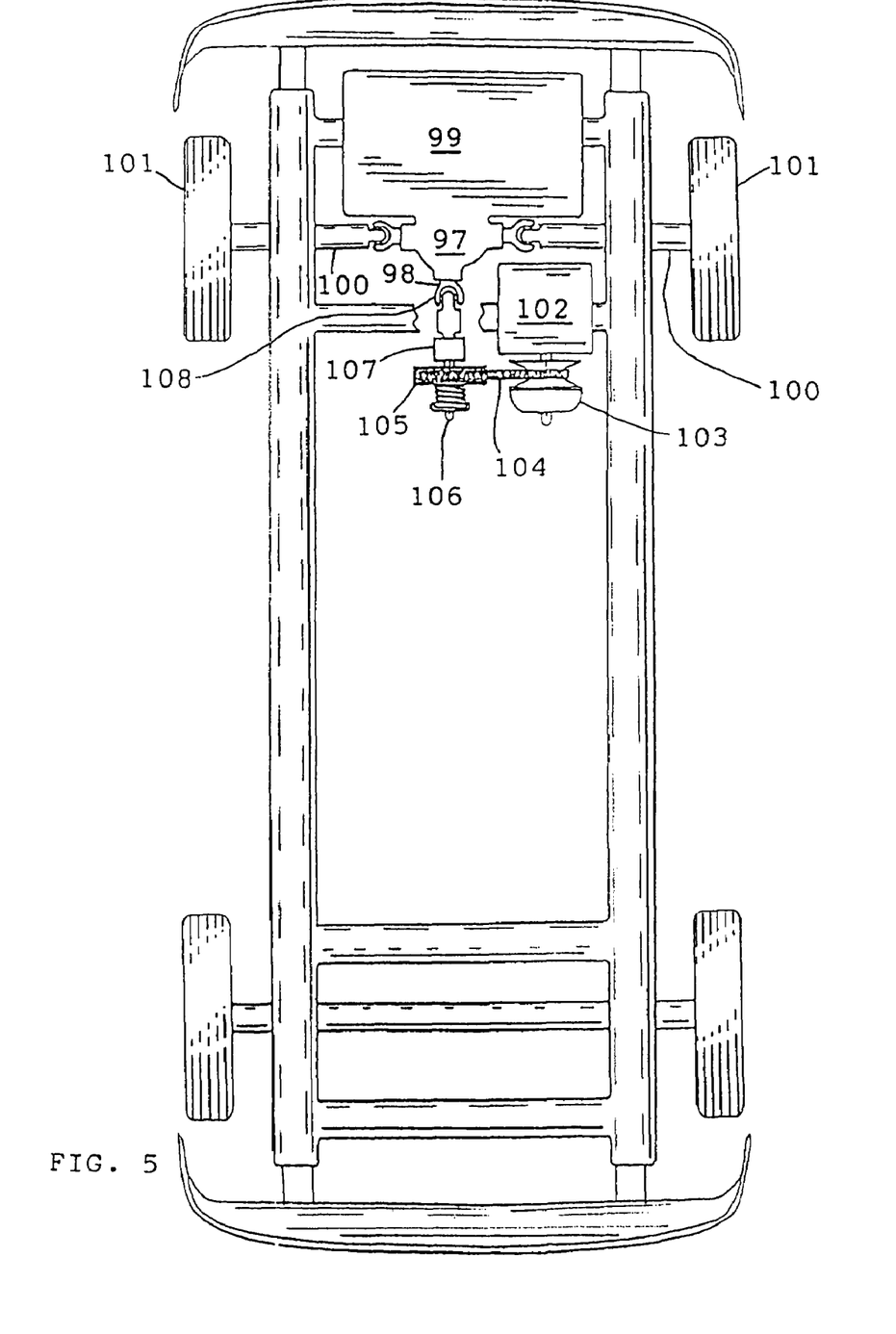
FIG. 5 is a schematic top view of a fourth alternative embodiment of the fuel-efficient vehicle of the present invention.
Figure 6:
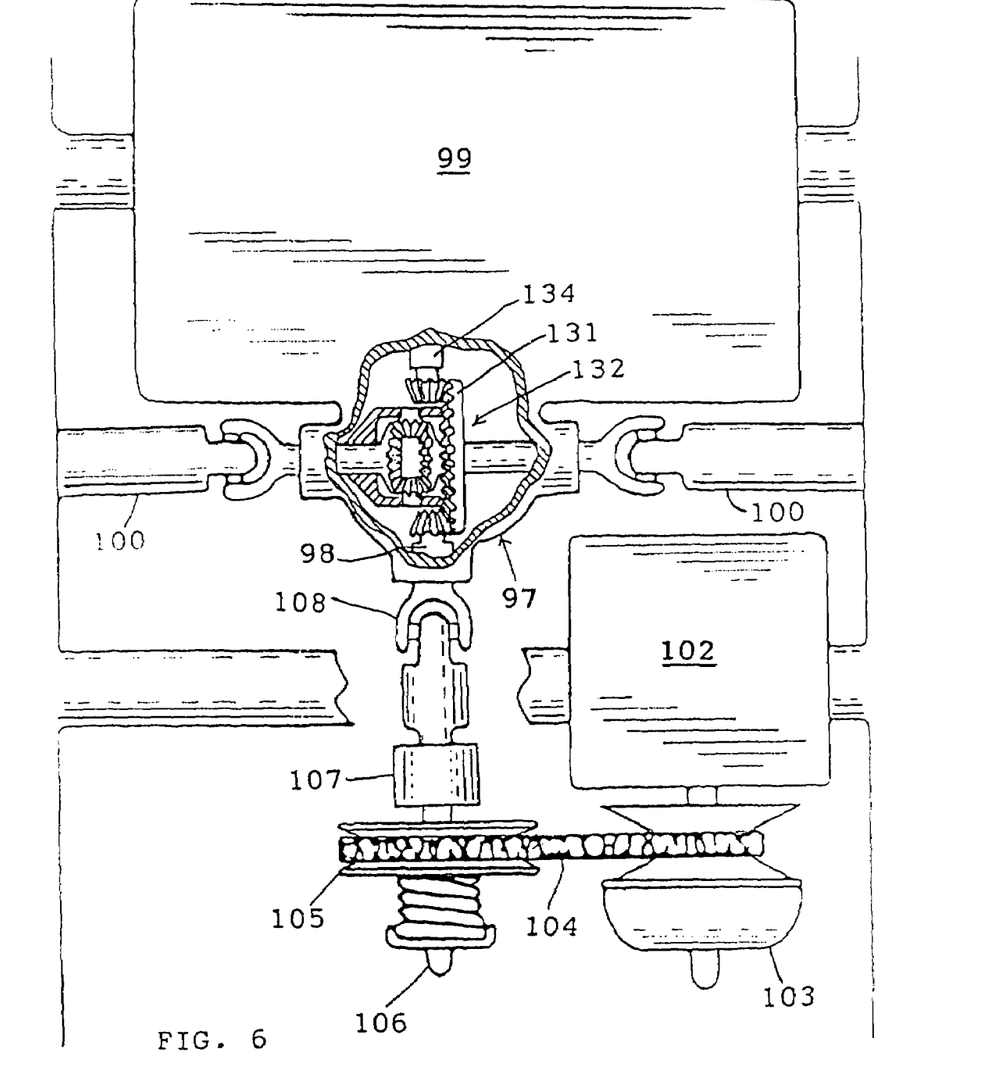
FIG. 6 is a magnified partially cutaway view of a portion of the embodiment shown in FIG. 5.

FIGS. 5 and 6 illustrate a fourth alternative embodiment of the invention, showing how the invention may be employed in a front wheel drive vehicle through a simple modification of the transaxle. In this embodiment, the transaxle 97 is modified by adding an external pinion drive 98 geared to the crown wheel 131 of the differential 132 portion of transaxle 97. External pinion drive 98 provides a second input port to the differential 132 in addition to the internal pinion drive 134 which transmits power from the speed change transmission portion of transaxle 97 to the differential 132.

To accelerate to cruising speed, power from primary engine 99 is transmitted through the speed change transmission portion of transaxle 97 through internal pinion drive 134 to crown wheel 131 of differential 132 thence to drive shafts 100 to drive wheels 101. After cruising speed is attained, transaxle 97 is shifted to "neutral" and primary engine 99 is slowed down to idle speed or stopped, to conserve fuel. Auxiliary engine 102 is then speeded up to engage CVT drive pulley 103 to drive belt 104 and driven pulley 105. Driven pulley 105 is fixedly mounted to jack shaft 106 which is journaled to jack shaft bearing 107 and connected through universal joint 108 to the external pinion drive 98 of transaxle 97 from which power is then transmitted through crown wheel 131 thence through drive shafts 100 to wheels 101. The vehicle then cruises economically on power from engine 102.

Figure 7:
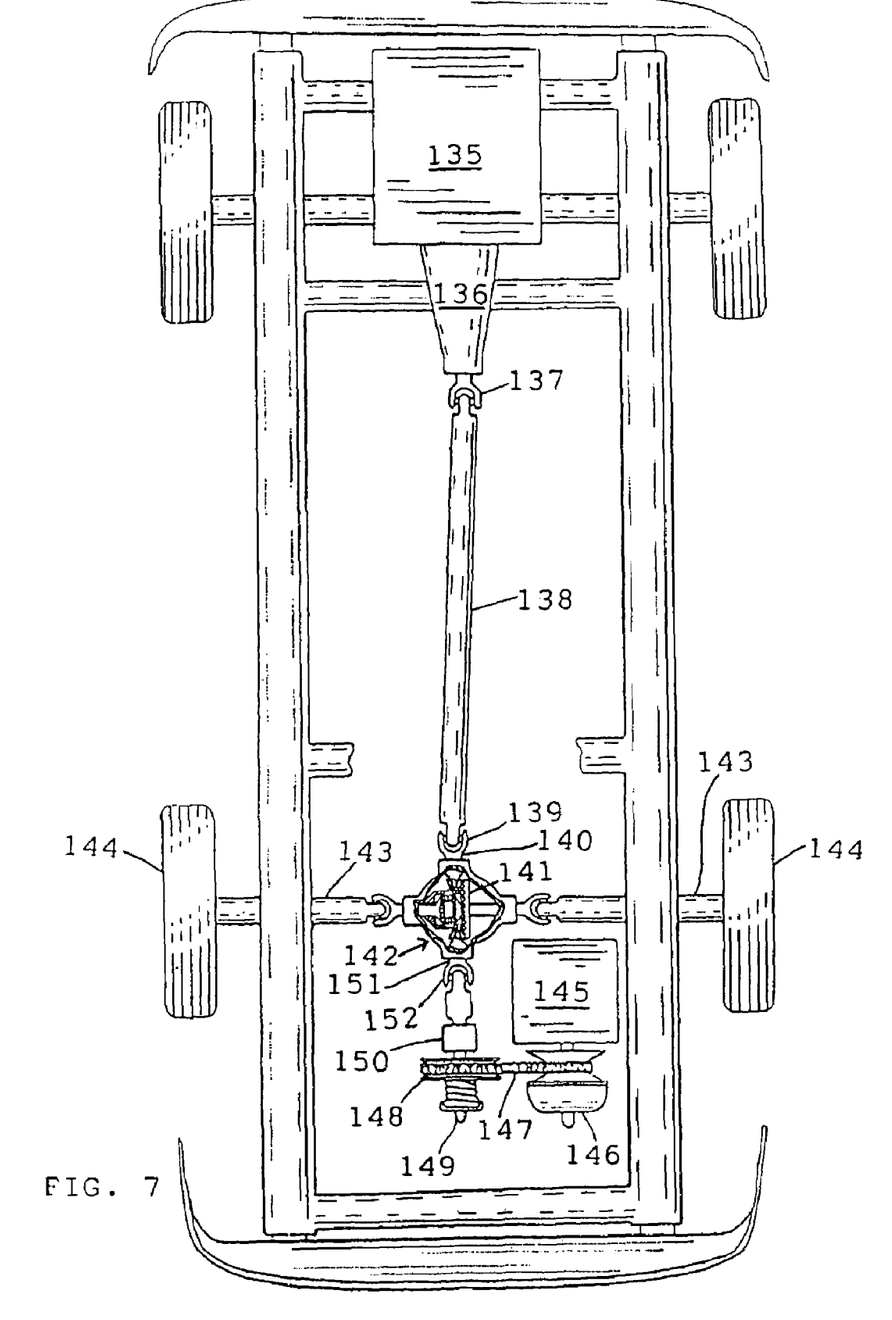
FIG. 7 is a schematic top view of a fifth alternative embodiment of the fuel-efficient vehicle of the present invention.

FIG. 7 illustrates a fifth alternative embodiment showing how a differential with two pinion drives may be employed in a front-engine rear wheel drive vehicle with independent rear suspension. Here power from a front-mounted primary engine 135 is transmitted through speed change transmission 136, front universal joint 137, propeller shaft 138, rear universal joint 139 thence through front pinion drive 140 and crown wheel 141 of differential 142 thence through drive shafts 143 to drive wheels—to accelerate the vehicle to cruising speed. Speed change transmission 136 is then shifted to "neutral" and primary engine 135 is slowed to idle speed or stopped to conserve fuel. Auxiliary engine 145 is then speeded up to engage drive pulley 146 on drive belt 147 and driven pulley 148. Driven pulley 148 is fixedly mounted on jack shaft 149 which is journaled to jack shaft bearing 150 and connected to rear pinion drive 151 through auxiliary universal joint 152. Power is then transmitted from auxiliary engine 145 to rear pinion drive 151 thence to crown wheel 141 of differential 142 thence to drive shafts 143 and wheels 144 to keep the vehicle at cruising speed, economically.

Figure 8:
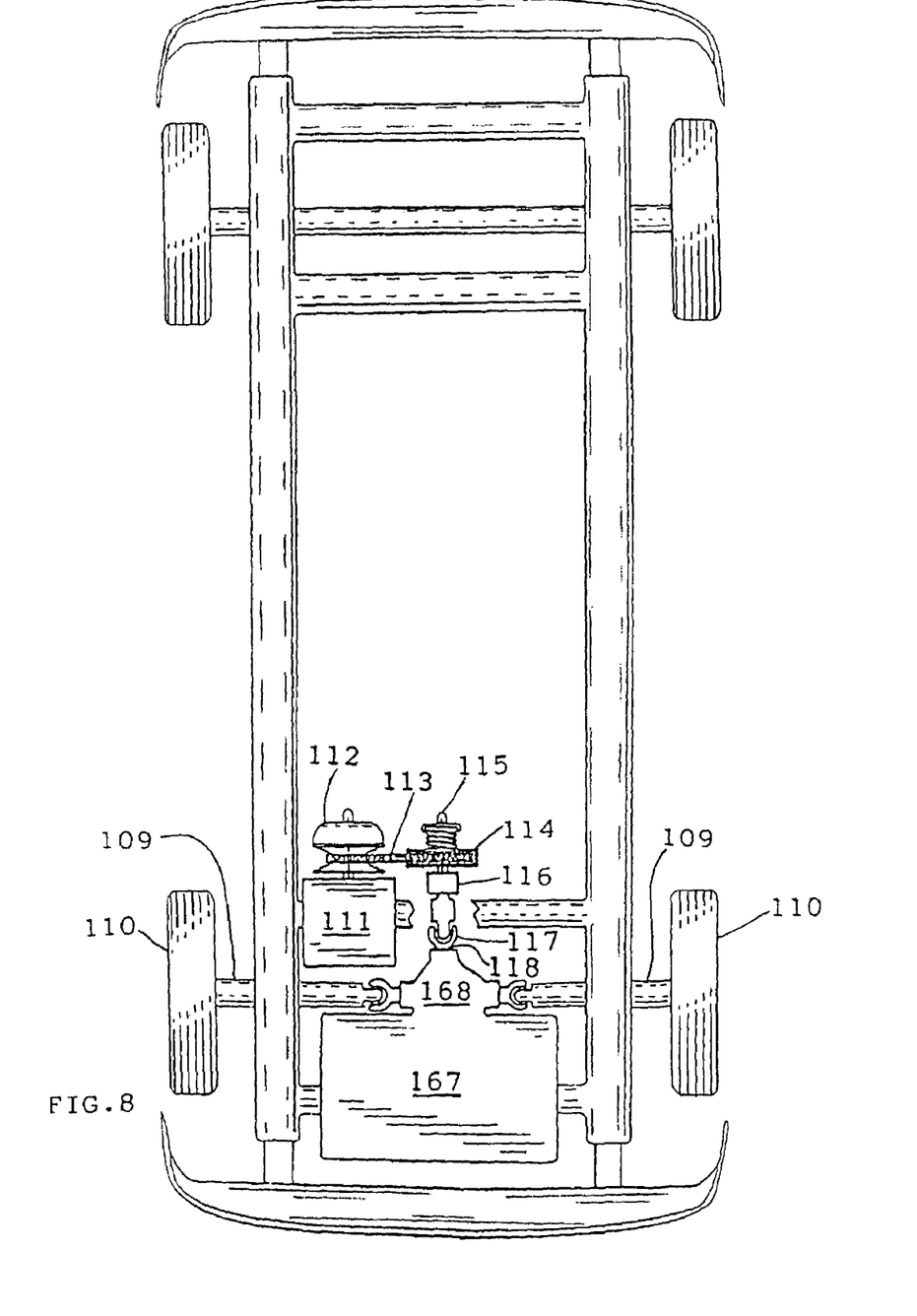
FIG. 8 is a schematic top view of a sixth alternative embodiment of the fuel-efficient vehicle of the present invention.

FIG. 8 illustrates how the invention may be employed in a rear-engine rear-drive vehicle with independent rear suspension, using the modified transaxle of the type shown in FIGS. 5 and 6. Power from primary engine 167 is transmitted through transaxle 168 to drive axles 109 and drive wheels 110 to accelerate the vehicle to cruising speed. Primary engine 167 is then slowed to idle speed or stopped altogether to conserve fuel. To maintain cruising speed, engine 111 is speeded up to cause CVT drive pulley 112 to engage drive belt 113 and drive driven pulley 114. Driven pulley 114 is fixedly mounted on jack shaft 115 which is journaled to jack shaft bearing 116. Jack shaft 115 is connected through universal joint 117 to external pinion drive 118 of transaxle 168. Thus, the vehicle is maintained at cruising speed economically by power from engine 111 transmitted through drive pulley 112, drive belt 113, driven pulley 114, jack shaft 115, universal joint 117 and external pinion drive 118 to transaxle 168, thence to drive shafts 109 and drive wheels 110.

It is an essential feature of this invention that means are provided to prevent the operation or the "engine drag" of one engine from interfering with the operation of the other. Much of this is accomplished through the use of the movable-sheave continuously-variable-ratio torque converter used with the auxiliary engine in all of the above preferred embodiments. One reason for this choice is that this type of automatic transmission automatically disengages whenever the auxiliary engine is running below the "engagement speed." It therefore remains disengaged while the vehicle is accelerating or climbing, etc., or even going in reverse using the primary engine, during which time the auxiliary engine is presumably running at slow "idle" speed or is not running at all. It only engages when the auxiliary engine is speeded up above the engagement speed to permit the vehicle to travel at cruising speed economically, and during this time the regular transmission is first shifted to "neutral" before the primary engine is slowed down to idle speed or stopped. There is nothing to prevent the driver from using power from both engines while going forward to achieve really fast acceleration.

Although all the foregoing embodiments employed movable sheave CVT torque converters to transmit power from the auxiliary engine to the differential powering the drive wheels, the invention is not limited to embodiments using this particular type of releasable coupling. Thus, other types of releasable couplings may be used instead of the CVT torque converter. Other such couplings include dry plate clutches, dog clutches, centrifugal clutches, cone clutches, electromagnetic clutches and others. A particularly preferred clutch means is a sprag clutch, described in some detail in U.S. patent application Ser. No. 11/032,672, and incorporated herein by reference.

Figure 9:
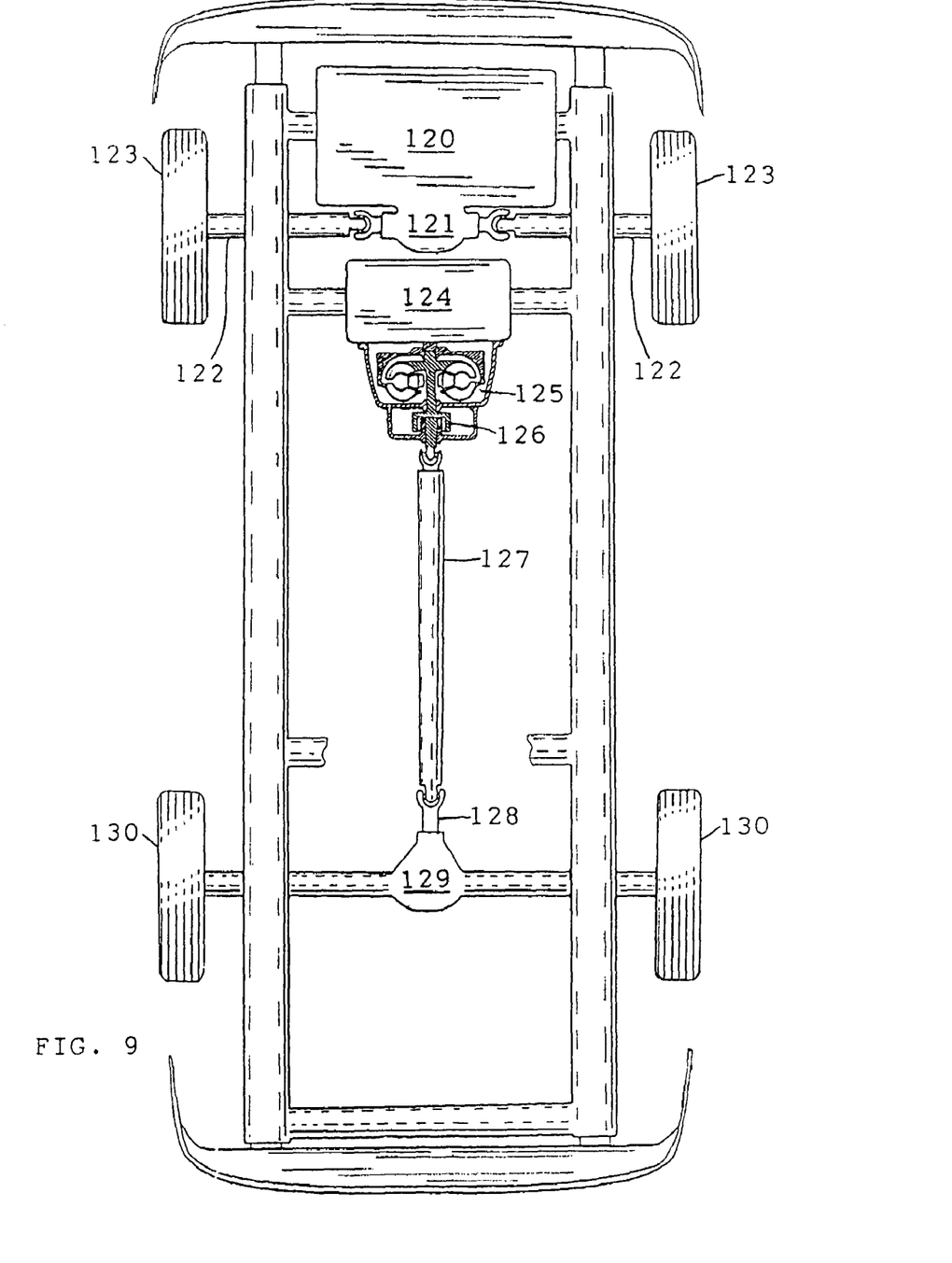
FIG. 9 is a schematic top view of a seventh alternative embodiment of the fuel-efficient vehicle of the present invention.

For example, FIG. 9 illustrates how a fluid coupling in combination with a sprag clutch may be used in a standard front engine-front wheel drive vehicle. Primary engine 120 transmits power through transaxle 121 and drive shafts 122 to front drive wheels 123 to accelerate the vehicle to cruising speed. Transaxle 121 is then shifted to "neutral" and the primary engine is slowed to idle speed or stopped to conserve fuel. Auxiliary engine 124 is then speeded up to operational speed to transmit power via fluid torque converter 125 thence through sprag clutch 126 to propeller shaft 127 and pinion drive 128 thence to differential 129 and to rear drive wheels 130, and thus economically maintain the vehicle at cruising speed. The fluid coupling 125 essentially decouples engine 124 from drive wheels 130 while the vehicle is driven (presumably slowly) in reverse; while the sprag clutch 126 remains disengaged while the vehicle is accelerating, etc., using primary engine 120, and engages only when engine 124 is speeded up to maintain cruising speed, during which time the transaxle 121 is shifted to neutral before the primary engine 120 is slowed down or stopped, as previously stated.

Although the preferred embodiments are described in great detail, it is to be understood that various changes and modifications may be made therein without departing from the spirit and scope of the invention which is more fully defined in the appended claims.

Having thus described my invention, what is claimed is:

1. In an automotive vehicle having a chassis, a car body mounted on said chassis, vehicle control means within said car body, power train means consisting of a primary engine, speed change transmission, propeller shaft and differential, and front and rear paired wheels, one of which pair being associated with said differential and thereby constituting driving wheels, the improvement comprising:
   a) an auxiliary internal combustion engine of smaller size and better fuel efficiency than said primary engine, yet having sufficient power to maintain the vehicle at an acceptable cruising speed,
   b) a power output shaft associated with said auxiliary engine, clutch means interactive with said power output shaft, and a power take-off shaft associated with said clutch means, and
   c) power transfer means for transferring power laterally between said power take-off shaft and said differential, whereby
   d) power from said auxiliary engine may be selectively conveyed to said power take-off shaft, thence to said power transfer means and to said differential,
   e) said conveyance of power occurring after said vehicle has been accelerated to cruising speed by said primary engine, and said speed change transmission means is shifted to "neutral" to disengage said primary engine from said differential, thereby placing the vehicle in a free wheeling state, after which
   f) said auxiliary engine is accelerated to operational speed, thereby automatically causing engagement of said clutch means and transfer of power to said differential, thus achieving two desirable results, namely:
   g) enabling said auxiliary engine to maintain the vehicle at cruising speed with reduced fuel consumption per unit of distance traveled, and
   h) enabling the power train means including said primary engine to remain ready to be activated whenever increased power is needed.

2. The improved automotive vehicle of claim 1 wherein said power transfer means for transferring power laterally between said power take-off shaft and differential includes pinion gear means.

3. The improved automotive vehicle of claim 2 wherein said clutch means is a releasable coupling means selected from the group consisting of frictional clutch, centrifugal clutch and continuously variable torque converter.

4. The improved automotive vehicle of claim 3 wherein said power transfer means is selected from the group consisting of an endless chain connected to interactive sprockets, spur gear and combination thereof.

5. The improved automotive vehicle of claim 1 wherein a sprag clutch is interactively disposed between said power output shaft and said power transfer means.

6. The improved automotive vehicle of claim 2 wherein said speed change transmission is either manual or automatic and is capable of being shifted to neutral while the vehicle is in motion.

7. The improved automotive vehicle of claim 6 wherein said differential drives said rear wheels.

8. The improved automotive vehicle of claim 6 wherein said auxiliary engine is positioned at the rear of the vehicle in a manner facilitating retrofitting onto an existing vehicle.

9. The improved automotive vehicle of claim 2 wherein said primary engine is connected to said front drive wheels by a transaxle.

10. The improved automotive vehicle of claim 9 wherein said transaxle can be shifted to a neutral position at cruising speed of the vehicle, thereby permitting said primary engine to be slowed or stopped.

11. The improved automotive vehicle of claim 1 wherein said auxiliary engine, at operational speed, transmits power via a fluid torque converter to a sprag clutch, thence to a pinion drive interactive with said differential.

12. The improved automotive vehicle of claim 1 wherein power from said auxiliary engine is conveyed to said wheels without the intervention of a speed change transmission.

13. The improved automotive vehicle of claim 2 having a plurality of pinion gear means for receiving power from a plurality of power sources.

14. The improved automotive vehicle of claim 9 having a plurality of pinion gear means for receiving power from a plurality of power sources.

15. The improved automotive vehicle of claim 1 wherein said speed change transmission automatically shifts to neutral, and said auxiliary engine automatically accelerates to operational speed when said vehicle achieves cruising speed.

16. The improved automotive vehicle of claim 15 wherein said automatic changes are actuated by sensor means associated with said driving wheels.

17. The improved automotive vehicle of claim 16 wherein said automatic changes are achieved by the interaction of said sensor means with said vehicle control means.

* * * * *